(12) United States Patent
Saunders et al.

(10) Patent No.: US 8,631,927 B2
(45) Date of Patent: Jan. 21, 2014

(54) TRACK WITH OVERLAPPING LINKS FOR DRY COAL EXTRUSION PUMPS

(75) Inventors: Timothy Saunders, Rancho Palos Verdes, CA (US); John D. Brady, Northridge, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 329 days.

(21) Appl. No.: 12/487,856

(22) Filed: Jun. 19, 2009

(65) Prior Publication Data

US 2010/0320061 A1  Dec. 23, 2010

(51) Int. Cl.
*B65G 15/00* (2006.01)
*B65G 15/14* (2006.01)

(52) U.S. Cl.
CPC ..................... *B65G 15/14* (2013.01)
USPC .................. 198/626.1; 198/850

(58) Field of Classification Search
USPC ............... 198/626.1–626.6, 850, 851, 853; 474/228, 230, 231
See application file for complete search history.

(56) References Cited

U.S. PATENT DOCUMENTS

| | | | | |
|---|---|---|---|---|
| 1,011,589 | A | * | 12/1911 | Curtis ............................... 29/6.1 |
| 1,487,601 | A | * | 3/1924 | Priem ............................. 241/28 |
| 1,503,289 | A | * | 7/1924 | Priem ............................. 241/28 |
| 1,505,757 | A | * | 8/1924 | Warren ........................... 241/35 |
| 1,540,483 | A | * | 6/1925 | Lang ............................... 241/28 |
| 1,843,605 | A | * | 2/1932 | Lang .............................. 241/281 |
| 1,971,553 | A | | 8/1934 | Fisk |
| 2,144,547 | A | * | 1/1939 | Robinson et al. ............. 198/801 |
| 2,150,984 | A | * | 3/1939 | Near et al. .................. 241/101.4 |
| 2,466,639 | A | * | 4/1949 | Focke et al. .................... 474/220 |
| 2,547,888 | A | * | 4/1951 | Rhodes ........................ 241/186.3 |
| 2,850,183 | A | * | 9/1958 | Blundin ......................... 414/327 |
| 2,954,113 | A | * | 9/1960 | Hibbard et al. ........... 198/867.15 |
| 2,959,364 | A | * | 11/1960 | Anderson et al. .............. 241/200 |
| 2,999,581 | A | * | 9/1961 | Baugh ............................ 100/151 |
| 3,034,638 | A | * | 5/1962 | Franz ............................. 198/851 |
| 3,245,517 | A | | 4/1966 | Ward |
| 3,285,395 | A | * | 11/1966 | Resener ......................... 198/851 |
| 3,691,942 | A | * | 9/1972 | Wagley ......................... 100/151 |
| 3,844,398 | A | | 10/1974 | Pinat |
| 3,961,783 | A | | 6/1976 | Beaudoin |
| 4,069,911 | A | | 1/1978 | Ray |
| 4,274,536 | A | * | 6/1981 | Riegler et al. ................. 198/851 |

(Continued)

FOREIGN PATENT DOCUMENTS

| | | |
|---|---|---|
| EP | 1900941 | 3/2008 |
| FR | 1090987 | 4/1955 |
| GB | 1444506 | 8/1976 |
| GB | 2017621 | 10/1979 |

OTHER PUBLICATIONS

International Search Report and Written Opinion dated Aug. 12, 2010.

(Continued)

*Primary Examiner* — William R Harp
(74) *Attorney, Agent, or Firm* — Carlson, Gaskey & Olds, P.C.

(57) ABSTRACT

A chain for a particulate material extrusion pump includes a plurality of links, each of the plurality of links having a link body and a link ledge, wherein each link ledge of the plurality of links at least partially overlaps the link body of an adjacent one of the plurality of links.

32 Claims, 6 Drawing Sheets

(56) References Cited

U.S. PATENT DOCUMENTS

| | | | |
|---|---|---|---|
| 4,611,646 A | 9/1986 | Wassmer et al. | |
| 4,664,253 A * | 5/1987 | Fahrion | 198/851 |
| 4,694,757 A * | 9/1987 | Hawkins et al. | 110/271 |
| 4,697,696 A * | 10/1987 | Howe et al. | 198/822 |
| 4,831,782 A | 5/1989 | Clough et al. | |
| 4,850,146 A | 7/1989 | Clough et al. | |
| 4,883,159 A * | 11/1989 | Ketonen | 198/692 |
| 4,979,928 A | 12/1990 | Lindsay | |
| 4,988,239 A | 1/1991 | Firth | |
| 5,076,422 A | 12/1991 | Clopton | |
| 5,094,340 A | 3/1992 | Avakov | |
| 5,102,285 A | 4/1992 | Gust | |
| 5,137,144 A * | 8/1992 | Uehara | 198/822 |
| 5,139,131 A | 8/1992 | Persson et al. | |
| 5,170,882 A | 12/1992 | Tekathen et al. | |
| 5,435,433 A | 7/1995 | Jordan et al. | |
| 5,492,216 A | 2/1996 | McCoy et al. | |
| 5,779,583 A | 7/1998 | Nakatani et al. | |
| 6,085,437 A | 7/2000 | Stipp | |
| 6,142,091 A | 11/2000 | Henriksen | |
| 6,257,567 B1 | 7/2001 | Hansmann et al. | |
| 6,296,110 B1 | 10/2001 | van Zijderveld et al. | |
| 6,308,436 B1 | 10/2001 | Stipp | |
| 6,393,719 B1 | 5/2002 | Stipp | |
| 6,470,597 B1 | 10/2002 | Stipp | |
| 6,533,104 B1 | 3/2003 | Starlinger-Huemer et al. | |
| 6,662,545 B1 * | 12/2003 | Yoshida | 59/78 |
| 6,875,697 B2 | 4/2005 | Trivedi | |
| 7,387,197 B2 | 6/2008 | Sprouse et al. | |
| 7,410,225 B1 | 8/2008 | Marzetta et al. | |
| 2005/0049098 A1 * | 3/2005 | Butterfield | 474/212 |

OTHER PUBLICATIONS

Notification concerning transmittral of international preliminary report on patentability, dated Jan. 5, 2011, International Application No. PCT/US2010/.031139.

* cited by examiner

TRACK WITH OVERLAPPING LINKS FOR DRY COAL EXTRUSION PUMPS

STATEMENT REGARDING FEDERALLY SPONSORED RESEARCH OR DEVELOPMENT

This disclosure was made with Government support under DE-FC26-04NT42237 awarded by The Department of Energy. The Government has certain rights in this disclosure.

BACKGROUND

The present disclosure relates to a dry coal extrusion pump for coal gasification, and more particularly to a track therefor.

The coal gasification process involves conversion of coal or other carbon-containing solids into synthesis gas. While both dry coal and water slurry are used in the gasification process, dry coal pumping may be more thermally efficient than current water slurry technology.

In order to streamline the process and increase the mechanical efficiency of dry coal gasification, the use of dry coal extrusion pumps has steadily become more common in dry coal gasification. Some currently available dry coal extrusion pumps suffer from internal shear failure zones and flow stagnation problems. The presence of failure zones may lead to decreased mechanical efficiency.

SUMMARY

A chain for a particulate material extrusion pump according to an exemplary aspect of the present disclosure includes a plurality of links, each of the plurality of links having a link body and a link ledge, wherein each link ledge of the plurality of links at least partially overlaps the link body of an adjacent one of the plurality of links.

A chain for a particulate material extrusion pump according to an exemplary aspect of the present disclosure includes a plurality of forward links, each of the plurality of forward links having an forward link body with an overlapping forward link ledge. A plurality of aft links, each of the plurality of aft links having an aft link body with an overlapping aft link ledge, each overlapping forward link ledge at least partially overlaps an adjacent aft link body and each overlapping aft link ledge at least partially overlaps an adjacent forward link body.

A pump for transporting particulate material according to an exemplary aspect of the present disclosure includes a passageway defined in part by at least one chain, the chain includes a plurality of forward links, each of the plurality of forward links having an forward link body with an overlapping forward link ledge, and a plurality of aft links, each of the plurality of aft links having an aft link body with an overlapping aft link ledge, each overlapping forward link ledge at least partially overlaps an adjacent aft link body and each overlapping aft link ledge at least partially overlaps an adjacent forward link body.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
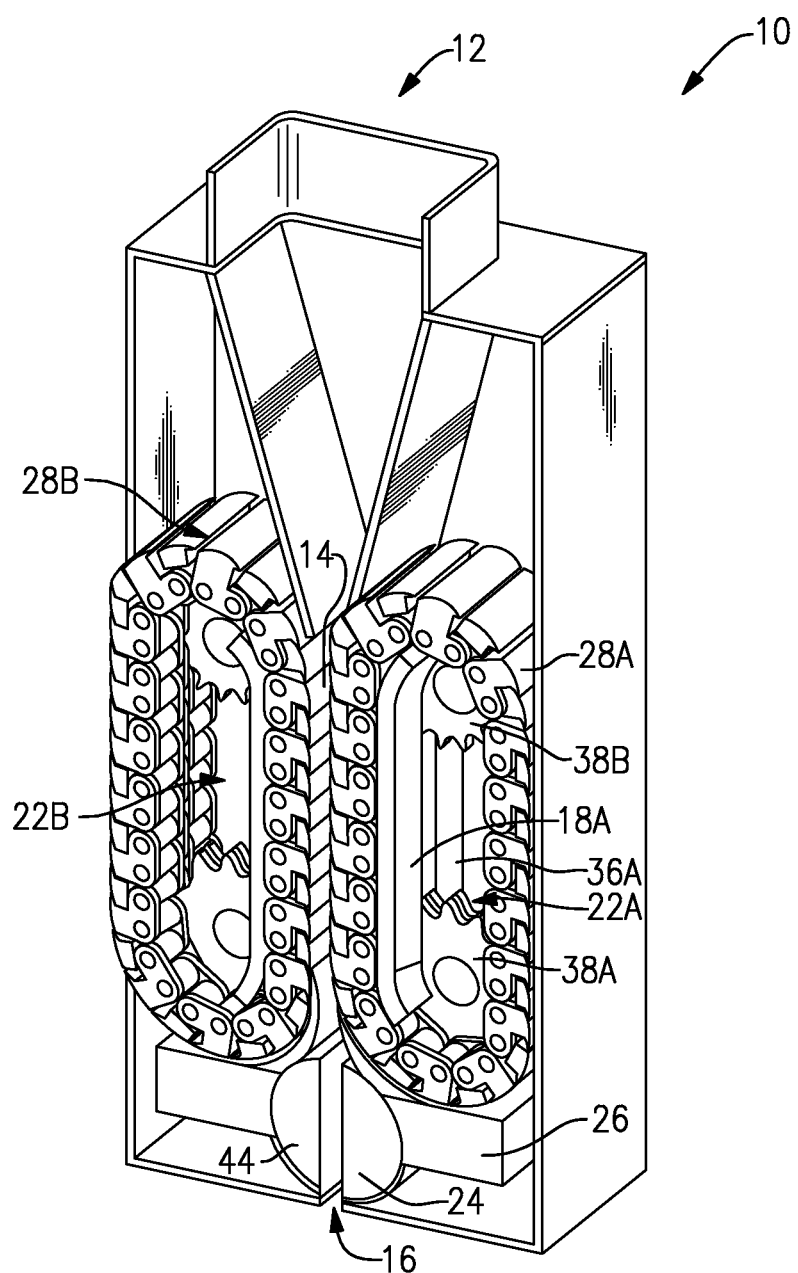
FIG. 1A is a perspective view of a dry coal extrusion pump.
Figure 1B:
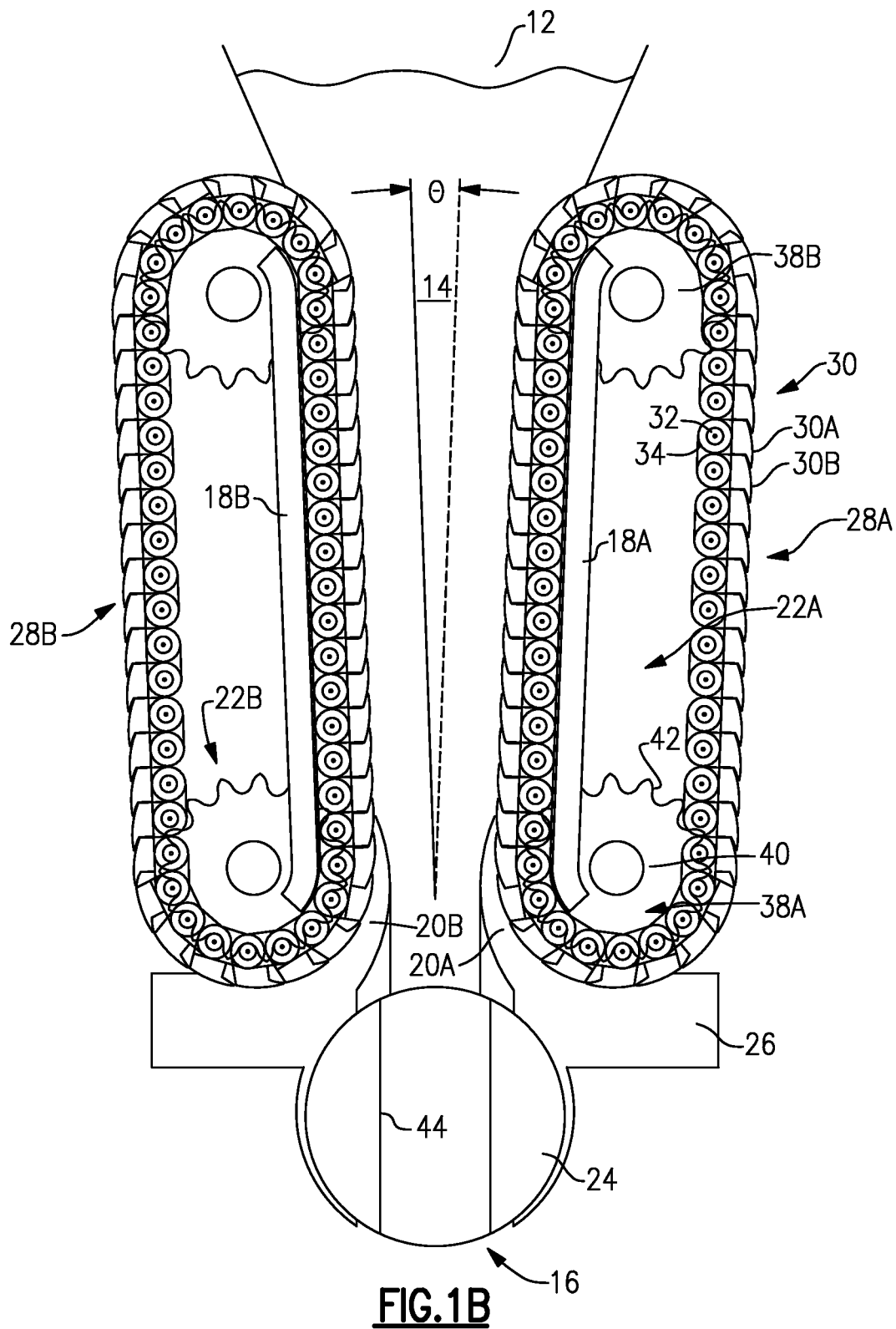
FIG. 1B is a front view of the dry coal extrusion pump.

FIGS. 1A and 1B schematically illustrate a perspective and front view, respectively, of a dry coal extrusion pump 10 for transportation of a dry particulate material such as pulverized dry coal. Although pump 10 is discussed as transporting pulverized dry coal, pump 10 may transport any dry particulate material and may be used in various industries, including, but not limited to the following markets: petrochemical, electrical power, food, and agricultural.

The pump 10 generally includes an inlet 12, a passageway 14, an outlet 16, a first load beam 18A, a second load beam 18B, a first scraper seal 20A, a second scraper seal 20B, a first drive assembly 22A, a second drive assembly 22B, a valve 24, and an end wall 26. Pulverized dry coal is introduced into pump at inlet 12, communicated through passageway 14, and expelled from pump 10 at outlet 16. Passageway 14 is defined by first chain 28A and second chain 28B, which are positioned substantially parallel and opposed to each other. First chain 28A, together with second chain 28B, drives the pulverized dry coal through passageway 14. It should be understood that first chain 28A and second chain 28B are generally alike with the exception that first chain 28A is driven in a direction opposite second chain 28B such that only first chain 28A and systems associate therewith will be described in detail herein. It should be further understood that the term "chain" as utilized herein operates as a belt to transport dry particulate material and generate work from the interaction between the first chain 28A, the second chain 28B and the material therebetween.

Figure 2A:
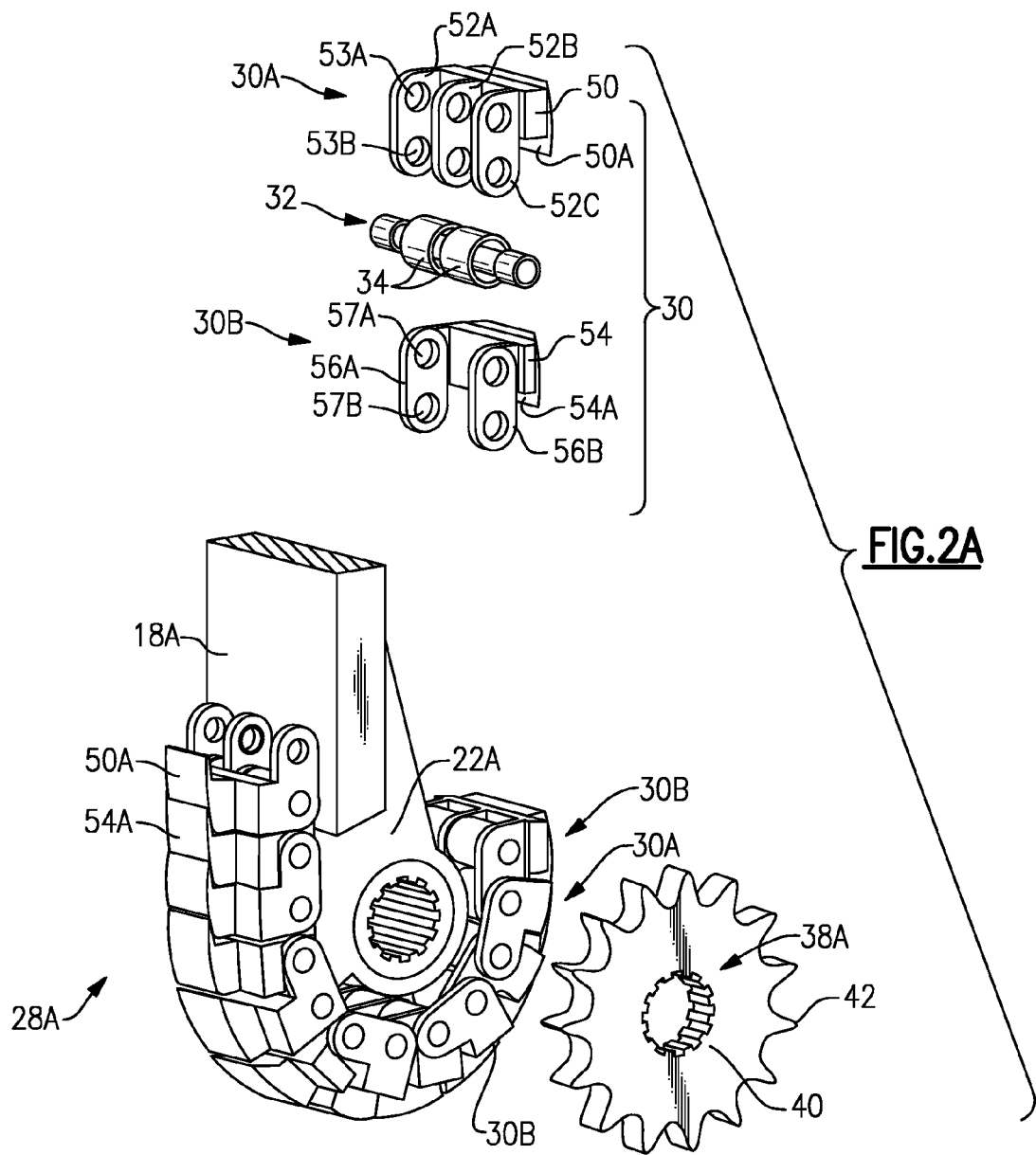
FIG. 2A is an exploded view of a link assembly for a dry coal extrusion pump.
Figure 2B:
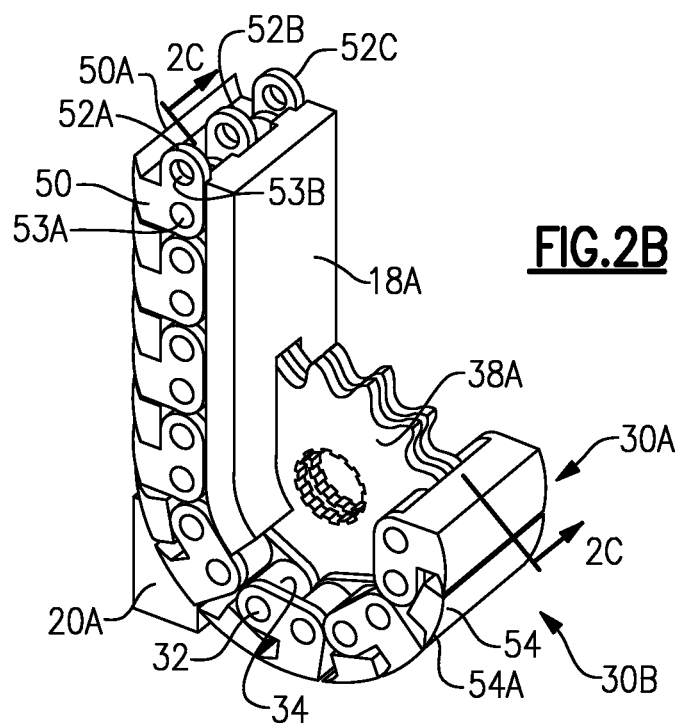
FIG. 2B is a perspective view of the link assembly of FIG. 2A.
Figure 2C:
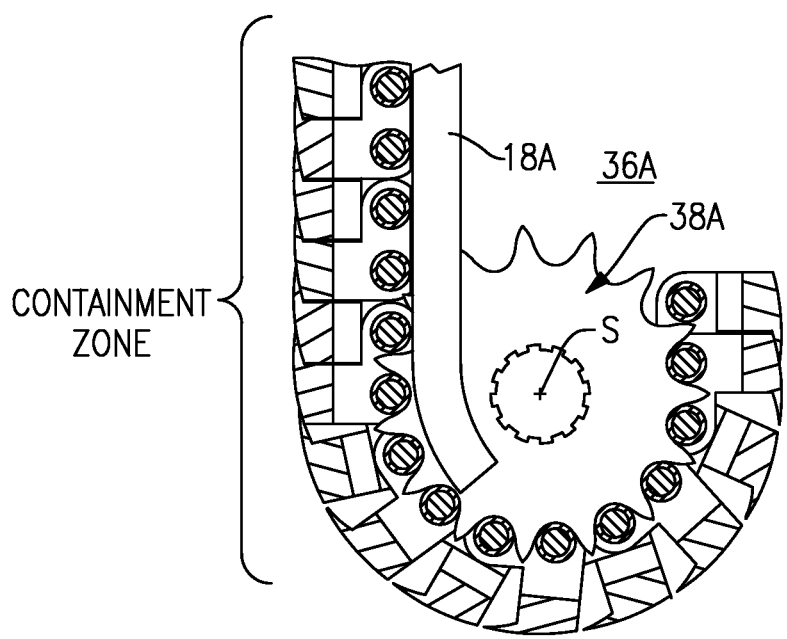
FIG. 2C is a side view of the chain illustrating a contamination zone along a load beam defined between drive sprockets.

The first chain 28A is formed from a link assembly 30 having a plurality of forward links 30A and a plurality of aft links 30B connected in an alternating a continuous series relationship by a link axle 32 which also supports a plurality of track wheels 34 (FIG. 2A). Track wheels 34 are mounted to the link axle 32 and function to transfer the mechanical compressive loads normal to link assembly 30 into load beam 18A (FIG. 2C).

First and second load beams 18A and 18B are positioned within first chain 28A and second chain 28B, respectively. First load beam 18A carries the mechanical load from first chain 28A and maintains the section of first chain 28A which defines passageway 14 in a substantially linear form (FIG. 2B). The pulverized dry coal being transported through passageway 14 creates solid stresses on first chain 28A in both a compressive outward direction away from passageway 14 as well as in a shearing upward direction toward inlet 12. The compressive outward loads are carried from link assembly 30 into link axle 32, into track wheels 34, and into first load beam 18A (FIG. 2C). First load beam 18A thus supports first chain 28A from collapsing into first interior section 36A of the first chain 28A as the dry pulverized coal is transported through passageway 14. The shearing upward loads are transferred from link assembly 30 directly into drive sprockets 38A, 38B and drive assembly 22A.

First scraper seal 20A is positioned proximate passageway 14 and outlet 16. First chain 28A and first scraper seal 20A form a seal between pump 10 and the outside atmosphere. Thus, the pulverized dry coal particles that become caught between first chain 28A and first scraper seal 20A become a moving pressure seal for first chain 28A. The exterior surface of first scraper seal 20A defines a relatively small angle with the straight section of first chain 28A in order to scrape the pulverized dry coal stream off of the moving first chain 28A. The angle prevents pulverized dry coal stagnation that may lead to low pump mechanical efficiencies. In an exemplary embodiment, first scraper seal 20A defines a 15 degree angle with the straight section of first chain 28A. First scraper seal 20A may be made of any suitable material, including, but not limited to, hardened tool steel.

First drive assembly 22A may be positioned within first interior section 36A of first chain 28A and drives first chain 28A in a first direction. First drive assembly 22A includes at least two drive sprockets 38A and 38B positioned at opposing ends of first chain 28A. In the disclosed, non-limiting embodiment, each of drive sprockets 38A and 38B has a pair of generally circular-shaped sprocket bases 40 with a plurality of sprocket teeth 42 which extend respectively therefrom for rotation about an axis S (FIG. 2C). The sprocket teeth 42 interact with first chain 28A to drive the first chain 28A around drive sprockets 38A and 38B. In an exemplary embodiment, first drive assembly 22A rotates first chain 28A at a rate of between approximately 1 foot per second and approximately 5 feet per second (ft/s).

Valve 24 is positioned proximate outlet 16 of pump 10 and is switchable between an open position and a closed position. A slot 44 runs through valve 24 and controls whether the pulverized dry coal may pass through outlet 16 of pump 10 into a discharge tank (not shown) positioned beneath pump 10. The width of slot 44 is larger than outlet 16 between scraper seals 20A and 20B. When valve 24 is in the closed position, slot 44 is not aligned with passageway 14 and outlet 16, prevent the pulverized dry coal from exiting pump 10. Valve 24 is typically in the closed position when first and second chain 28A and 28B of pump 10 are not rotating.

Valve 24 remains in the closed position as pump 10 starts up. Once first and second chain 28A and 28B begin rotating, valve 24 is rotated 90 degrees to the open position (FIG. 1B). When valve 24 is in the open position, slot 44 is aligned with passageway 14 and outlet 16 to communicate the pulverized dry coal in passageway 14 to flow through pump 10 and into the discharge tank. In an exemplary embodiment, valve 24 is a cylinder valve.

The distance between sprockets 38A and 38B, in each of first and second drive assembly 22A and 22B, the convergence half angle .theta. between load beams 18A and 18B, and the separation distance between scraper seals 20A and 20B may be defined to achieve the highest mechanical solids pumping efficiency possible for a particular dry particulate material without incurring detrimental solids back flow and blowout inside pump 10. High mechanical solids pumping efficiencies are generally obtained when the mechanical work exerted on the solids by pump 10 is reduced to near isentropic (i.e., no solids slip) conditions.

Referring to FIGS. 2A-2C, the link assembly 30 provides for a flat surface along load beam 18A as well as the flexibility to turn around each sprocket 38A, 38B. The first chain 28A defines the first interior section 36A in which the first drive assembly 22A may be located.

The link assembly 30 includes the plurality of forward links 30A and the plurality of aft links 30B which are connected by the link axles 32. The link axles 32 provide for engagement with the sprocket teeth 42. Link assembly 30 and link axles 32 may be made of any suitable material, including, but not limited to, hardened tool steel. Each forward link 30A is located adjacent to an aft link 30B in an alternating arrangement.

Each forward link 30A generally includes a forward link body 50 with an overlapping forward link ledge 50A and a plurality of forward link plates 52A, 52B, 52C. Although three forward link plates 52A, 52B, 52C are disclosed in the illustrated embodiment, it should be understood that any number of link plates may alternatively be provided. Each of the plurality of forward link plates 52A, 52B, 52C include a first aperture 53A and a second aperture 53B. The term "body" as utilized herein defines the section of each link which provides a primary working surface adjacent to the passageway 14. The term "ledge" as utilized herein defines the section of each link which extends from the body to at least partially overlap and be supported by an adjacent "body". It should be understood that the ledge may extend from the leading edge section or the trailing edge section of the respective body. It should be understood that the term "plate" includes, but is not limited to, flat members which extend from the body.

Each aft link 30B generally includes an aft link body 54 with an overlapping aft link ledge 54A and a plurality of aft link plates 56A, 56B. Although two aft link plates 52A, 52B are disclosed in the illustrated embodiment, it should be understood that any number of link plates may alternatively be provided. Each of the plurality of aft link plates 56A, 56B include a first aperture 57A and a second aperture 57B.

The first aperture 53A and the second aperture 53B of each forward link 30A are respectively connected to the first aperture 57A of one aft link 30B and the second aperture 57B of another aft link 30B through a respective link axle 32 (FIG. 2B). The aft link 30B and aft link 30B are linked to each side of the forward link 30A.

A track wheel 34, —two per link axle 32 in this non-limiting embodiment—are respectively mounted between the forward link plate 52A and aft link plate 56A, as well as between the forward link plate 52C and aft link plate 56B (FIG. 2B). The track wheel 34 in one non-limiting embodiment may include a bearing collar.

The aft link plates 56A, 56B flank the center forward link plate 52B such that the aft link plates 56A, 56B are located outboard the drive sprocket 38A, 38B as the first chain 28A and the second chain 28B are driven thereby while the center forward link plate 52B passes between the sprocket base 40 (FIG. 2C).

Each forward link ledge 50A at least partially overlaps the adjacent aft link body 54 and each overlapping aft link ledge 54A at least partially overlaps the adjacent forward link body 50. An effective seal is thereby provided by the geometry of the forward chain line 30A and aft chain line 30B. Such geometry facilitates transport of the dry particulate material with minimal injection thereof into the link assembly 30.

Referring to FIG. 2C, each forward link 30A overlaps the adjacent respective aft link 30B in a contamination zone to prevent entrapment of foreign object debris (FOD). The contamination zone is defined generally along the passageway 14 for at least the length of the load beam 18A. The contamination zone is defined generally along the linear distance between sprockets 38A and 38B. That is, the first chain 28A, the second chain 28B defines a sealed surface which transports the dry particulate material along the containment zone.

Each forward link 30A at least partially separates from the adjacent respective aft link 30B outside of contamination zone and generally around the sprockets 38A and 38B to allow the FOD to be rejected out. That is, the first chain 28A, the second chain 28B at least partially separate to reject dry particulate material outside of the containment zone. Notably, the forward link ledge 50A and the aft link ledge 54A are located generally along a trailing edge section of the respective forward link body 50 and aft link body 54. That is, the forward link ledge 50A and the aft link ledge 54A trail the rotational direction of the respective first and second chain 28A and 28B.

Figure 3A:
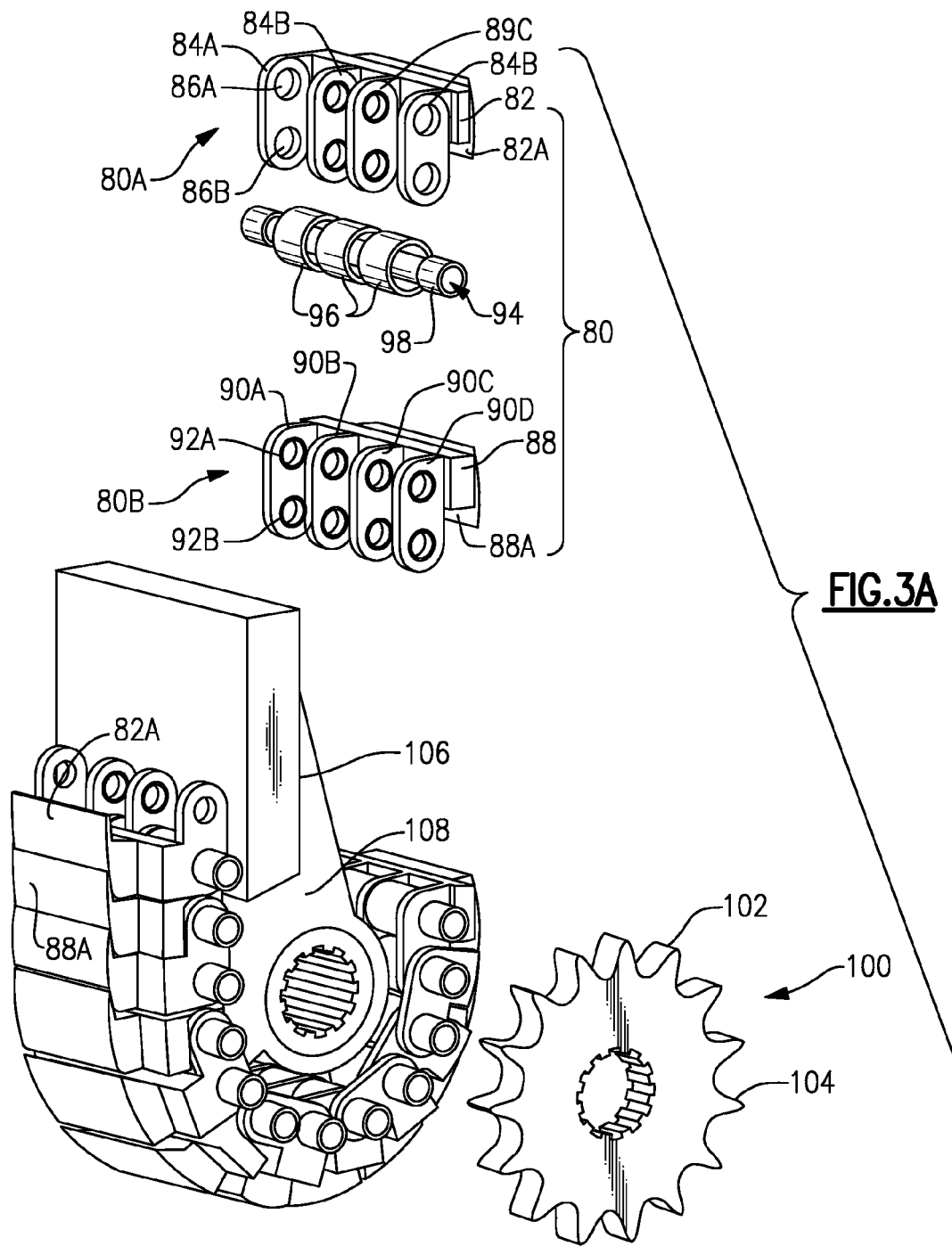
FIG. 3A is an exploded view of another link assembly for a dry coal extrusion pump.

Referring to FIG. 3A, another link assembly 80 includes a plurality of forward links 80A and a plurality of aft links 80B. Each forward link 80A generally includes a forward link body 82 with an overlapping forward link ledge 82A and a plurality of forward link plates 84A, 84B, 84C, 84D. Each of the plurality of forward link plates 84A, 84B, 84C, 84D include a first aperture 86A and a second aperture 86B.

Each aft link 80B generally includes an aft link body 88 with an overlapping aft link ledge 88A and a plurality of aft link plates 90A, 90B, 90C, 90D. Each of the plurality of aft link plates 90A, 90B, 90C, 90D includes a first aperture 92A and a second aperture 92B.

Each forward link 80A is located adjacent to an aft link 80B in an alternating arrangement with a link axle 94. Each link axle 94 supports a track wheel 96, —three per link axle 94 in this non-limiting embodiment—are respectively mounted between the forward link plates 84A, 84B, 84C, 84D and the aft link plates 90A, 90B, 90C, 90D. That is, the aft link plates 90A, 90B are located between the forward link plates 84A, 84B, and the aft link plates 90C, 90D are located between the forward link plates 84C, 84D.

Figure 3B:
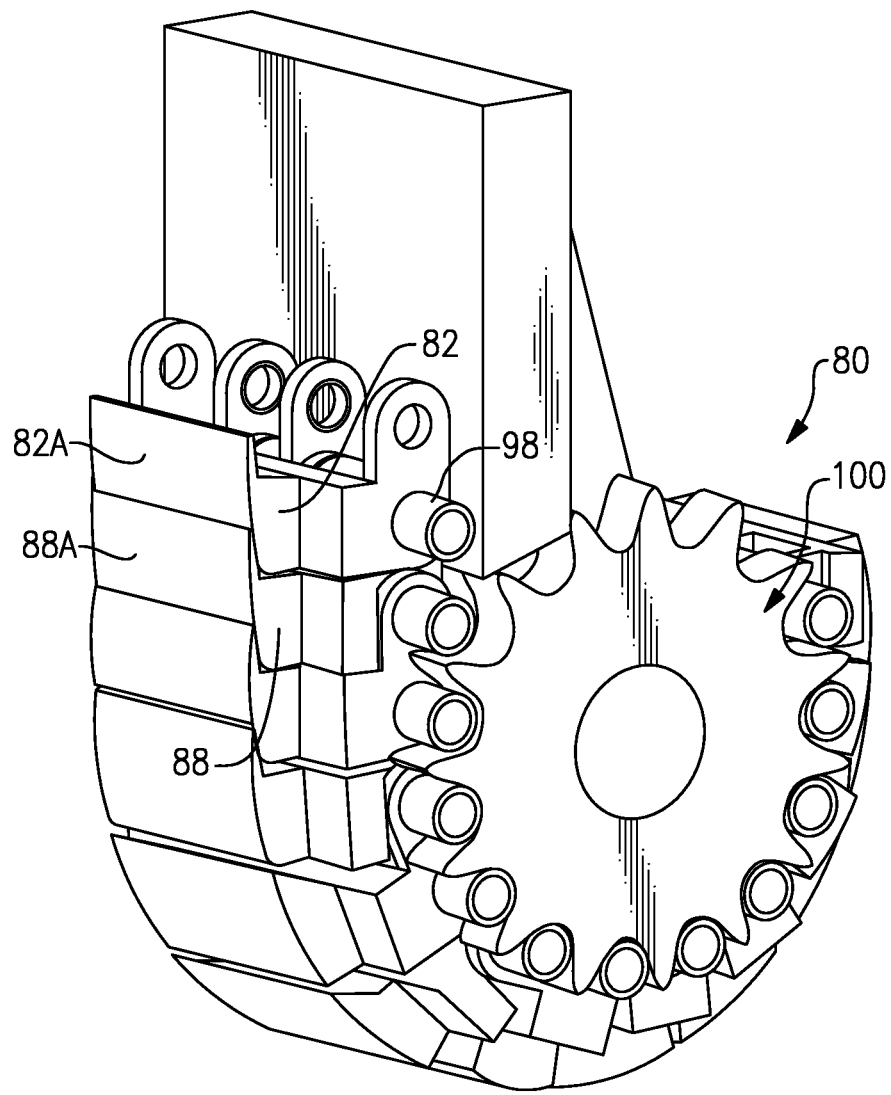
FIG. 3B is a perspective view of the link assembly of FIG. 3A.

A bushing 98 may be mounted to each end section of the link axle 94 to retain the link axle 94 within the connected forward link 80A and the aft link 80B and thereby retain each forward link 80A to each aft link 80B (FIG. 3B). The bushing 98 may be further utilized to provide an engagement surface for a drive sprocket 100. Each drive sprocket 100 includes generally circular shaped bases 102 with a plurality of sprocket teeth 104 which extend respectively therefrom. Notably, in this non-limiting embodiment, the drive sprocket 100 is mounted in an outboard position relative to the link assembly 80. A drive sprocket 100 may be mounted on both sides of a drive assembly 108 to flank a load beam 106.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A chain for a particulate material extrusion pump comprising:
a plurality of links, each of said plurality of links having a link body and a link ledge which extends therefrom, wherein each link ledge of each of said plurality of links at least partially overlaps the link body of an adjacent one of said plurality of links such that said link ledge and said link body that is at least partially overlapped by said link ledge together provide a flat surface, and each said link body including a plurality of link plates extending therefrom, each of said plurality of link plates including a first aperture and a second aperture such that said first apertures on said link body axially align and said second apertures on said link body axially align, said first apertures on each said link body being in axial alignment with said second apertures on a forward neighboring one of said plurality of links and said second apertures on each said link body being in axial alignment with said first apertures on an aft neighboring one of said plurality of links.

2. The chain as recited in claim 1, wherein each of said plurality of links is connected to said adjacent one of said plurality of links with a link axle.

3. The chain as recited in claim 2, further comprising at least one track wheel mounted to said link axle.

4. The chain as recited in claim 1, wherein said link ledge trails said link body with respect to a direction of the chain.

5. The chain as recited in claim 1, wherein said plurality of links are moveable along a path of travel that includes a linear portion and a curved portion, and said flat surface is provided in said linear portion.

6. The chain as recited in claim 5, wherein, in said curved portion, said link ledge is separated from said link body that is at least partially overlapped by said link ledge in said linear portion.

7. The chain as recited in claim 6, wherein, in said curved portion, said link ledge is separated in the direction of the path of travel such that there is an outwardly opening gap between said link ledge and said link body.

8. The chain as recited in claim 1, wherein the plurality of link plates extending from the link body extend in a first direction beyond the link ledge of the link body and in a second, opposite direction, but not beyond the link body in the second direction.

9. The chain as recited in claim 1, wherein each of said plurality of links includes a vertical gap between said plurality of link plates and said link ledge.

10. A chain for a particulate material extrusion pump comprising:
a plurality of forward links, each of said plurality of forward links having a forward link body with an overlapping forward link ledge; and
a plurality of aft links, each of said plurality of aft links having an aft link body with an overlapping aft link ledge, each overlapping forward link ledge at least partially overlaps an adjacent aft link body and each overlapping aft link ledge at least partially overlaps an adjacent forward link body such that said overlapping forward link ledge, said adjacent aft link body that is at least partially overlapped by said overlapping forward link ledge, said overlapping aft link ledge and said adjacent forward link body that is at least partially overlapped by said overlapping aft link ledge together provide a flat surface.

11. The chain as recited in claim 10, wherein each overlapping forward link ledge and each overlapping aft link ledge is a trailing ledge.

12. The chain as recited in claim 10, wherein each of said plurality of forward links is connected to an adjacent one of said plurality of aft links with a link axle.

13. The chain as recited in claim 12, further comprising at least one track wheel mounted to said link axle.

14. The chain as recited in claim 10, wherein each of said plurality of forward links includes three forward link plates, each of said three forward link plates include two apertures.

15. The chain as recited in claim 10, wherein each of said plurality of aft links includes two aft link plates, each of said two aft link plates include two apertures.

16. The chain as recited in claim 15, wherein each of said two apertures receive a link axle.

17. The chain as recited in claim 6, wherein each of said link axles supports at least one track wheel.

18. The chain as recited in claim 17, wherein a first track wheel is supported between a first forward link plate an and a first aft link plate and a second tack wheel is supported between a second forward link plate and a second aft link plate, said first track wheel and said second track wheel supported on a single link axle.

19. The chain as recited in claim 18, further comprising a center forward link plate between said first forward link plate and said second forward link plate.

20. The chain as recited in claim 10, wherein each said forward link body and each said aft link body define a working surface thereon.

21. The chain as recited in claim 10, wherein each of said plurality of forward links and each of said plurality of aft links include a plurality of link plates extending therefrom, each of said plurality of link plates including a first aperture and a second aperture such that said first apertures on said link body axially align and said second apertures on said link body axially align, said first apertures on each said link body being in axial alignment with said second apertures on an adjacent neighboring link body and said second apertures on each said link body being in axial alignment with said first apertures on another adjacent neighboring link body.

22. The chain as recited in claim 10, wherein said forward link includes a plurality of forward link plates extending therefrom and said aft link body includes a plurality of aft link plates extending therefrom, with a vertical gap between said plurality of forward link plates and said overlapping forward link ledge and a vertical gap between said plurality of aft link plates and said overlapping aft link ledge.

23. A pump for transporting particulate material comprising:
a passageway defined in part by at least one chain, said chain includes a plurality of links, each of said plurality of links having a link body and a link ledge which extends therefrom, wherein each link ledge of said plurality of links at least partially overlaps the link body of an adjacent one of said plurality of links, wherein said plurality of links includes a plurality of forward links and a plurality of aft links, each of said plurality of forward links having a forward link body with an overlapping forward link ledge, each of said plurality of aft links having an aft link body with an overlapping aft link ledge, each overlapping forward link ledge at least partially overlaps an adjacent aft link body and each overlapping aft link ledge at least partially overlaps an adjacent forward link body such that said overlapping forward link ledge, said adjacent aft link body that is at least partially overlapped by said overlapping forward link ledge, said overlapping aft link ledge and said adjacent forward link body that is at least partially overlapped by said overlapping aft link ledge together provide a flat surface.

24. The pump as recited in claim 23, further comprising a load beam positioned within the interior section of said chain.

25. The pump as recited in claim 23, further comprising a scraper seal positioned proximate said passageway and an outlet.

26. The pump as recited in claim 23, wherein said passageway defines a contamination zone, each overlapping forward link ledge at least partially overlaps said adjacent aft link body and each overlapping aft link ledge at least partially overlaps said adjacent forward link body within said contamination zone to minimize foreign object debris (FOD) entrapment.

27. The pump as recited in claim 26, wherein said contamination zone is defined generally along the passageway for at least a length of a load beam positioned within the interior section of said chain.

28. The pump as recited in claim 26, wherein said contamination zone is defined generally along said passageway for a linear distance between a first sprocket and a second sprocket engaged with said chain.

29. The pump as recited in claim 26, wherein each overlapping forward link ledge at least partially separates from said adjacent aft link body and each overlapping aft link ledge at least partially separates from said adjacent forward link body outside of said contamination zone.

30. The pump as recited in claim 29, wherein each overlapping forward link ledge at least partially separates from said adjacent aft link body and each overlapping aft link ledge at least partially separates from said adjacent forward link body adjacent to a first sprocket and a second sprocket engaged with said chain.

31. The pump as recited in claim 23, wherein each said forward link body and each aft link body define a working surface thereon.

32. The pump as recited in claim 23, wherein each of said plurality of forward links and each of said plurality of aft links include a plurality of link plates extending therefrom, each of said plurality of link plates including a first aperture and a second aperture such that said first apertures on said link body axially align and said second apertures on said respective link body axially align, said first apertures on each said link body being in axial alignment with said second apertures on an adjacent neighboring link body and said second apertures on each said link body being in axial alignment with said first apertures on another adjacent neighboring link body.

* * * * *